(12) United States Patent
Takabayashi

(10) Patent No.: US 8,403,453 B2
(45) Date of Patent: Mar. 26, 2013

(54) METHOD FOR FORMING INKJET IMAGE WHILE FLOWING THE INK IN AN INK CHAMBER

(75) Inventor: Toshiyuki Takabayashi, Tokyo (JP)

(73) Assignee: Konica Minolta Holdings, Inc., Tokyo (JP)

(*) Notice: Subject to any disclaimer, the term of this patent is extended or adjusted under 35 U.S.C. 154(b) by 186 days.

(21) Appl. No.: 12/958,635

(22) Filed: Dec. 2, 2010

(65) Prior Publication Data
US 2011/0141187 A1 Jun. 16, 2011

(30) Foreign Application Priority Data
Dec. 11, 2009 (JP) .................. 2009-281510

(51) Int. Cl.
*B41J 2/15* (2006.01)
(52) U.S. Cl. ........................................ 347/20
(58) Field of Classification Search .......... 347/20, 347/102, 68, 94, 85; 106/31.48
See application file for complete search history.

(56) References Cited

U.S. PATENT DOCUMENTS

| | | | | |
|---|---|---|---|---|
| 6,835,240 B2* | 12/2004 | Nishita et al. | ............. | 106/31.48 |
| 7,909,443 B2* | 3/2011 | Hirato | ............. | 347/85 |
| 2007/0058020 A1* | 3/2007 | Wetjens et al. | ............. | 347/102 |
| 2007/0176978 A1* | 8/2007 | Sugahara | ............. | 347/68 |
| 2009/0102907 A1* | 4/2009 | Yamanaka et al. | ............. | 347/94 |
| 2009/0225138 A1 | 9/2009 | Watanabe | | |
| 2010/0118095 A1* | 5/2010 | Nakamura | ............. | 347/102 |

FOREIGN PATENT DOCUMENTS

| | | | |
|---|---|---|---|
| EP | 1-681-323 | | 7/2006 |
| EP | 1-826-252 | | 8/2007 |
| EP | 2-184-173 | | 5/2010 |
| JP | 2004034543 | * | 2/2004 |
| JP | 2006-193745 | | 7/2006 |
| JP | 2008-513245 | | 5/2008 |
| JP | 2009-510184 | | 3/2009 |

* cited by examiner

Primary Examiner — Stephen Meier
Assistant Examiner — Carlos A Martinez
(74) Attorney, Agent, or Firm — Lucas & Mercanti, LLP

(57) ABSTRACT

The method for forming an inkjet image provides a high-resolution image with a stable ink ejection and the image exhibits excellent curability, The image is formed using an inkjet recording head comprising a plurality of pressure chambers, a plurality of nozzles in communication with the pressure chambers and positioned on one side of the pressure chamber, and an ink chamber in communication with the pressure chamber and positioned on an opposite side of the pressure chamber. The ink composition in the ink chamber has a photo-initiator, a polymerizable compound and a gelling agent. The temperature of the ink composition in the ink chamber is kept at 70° C.-140° C. during an image recording and during standing-by. The ink composition is forced to flow in the ink chamber.

5 Claims, 2 Drawing Sheets

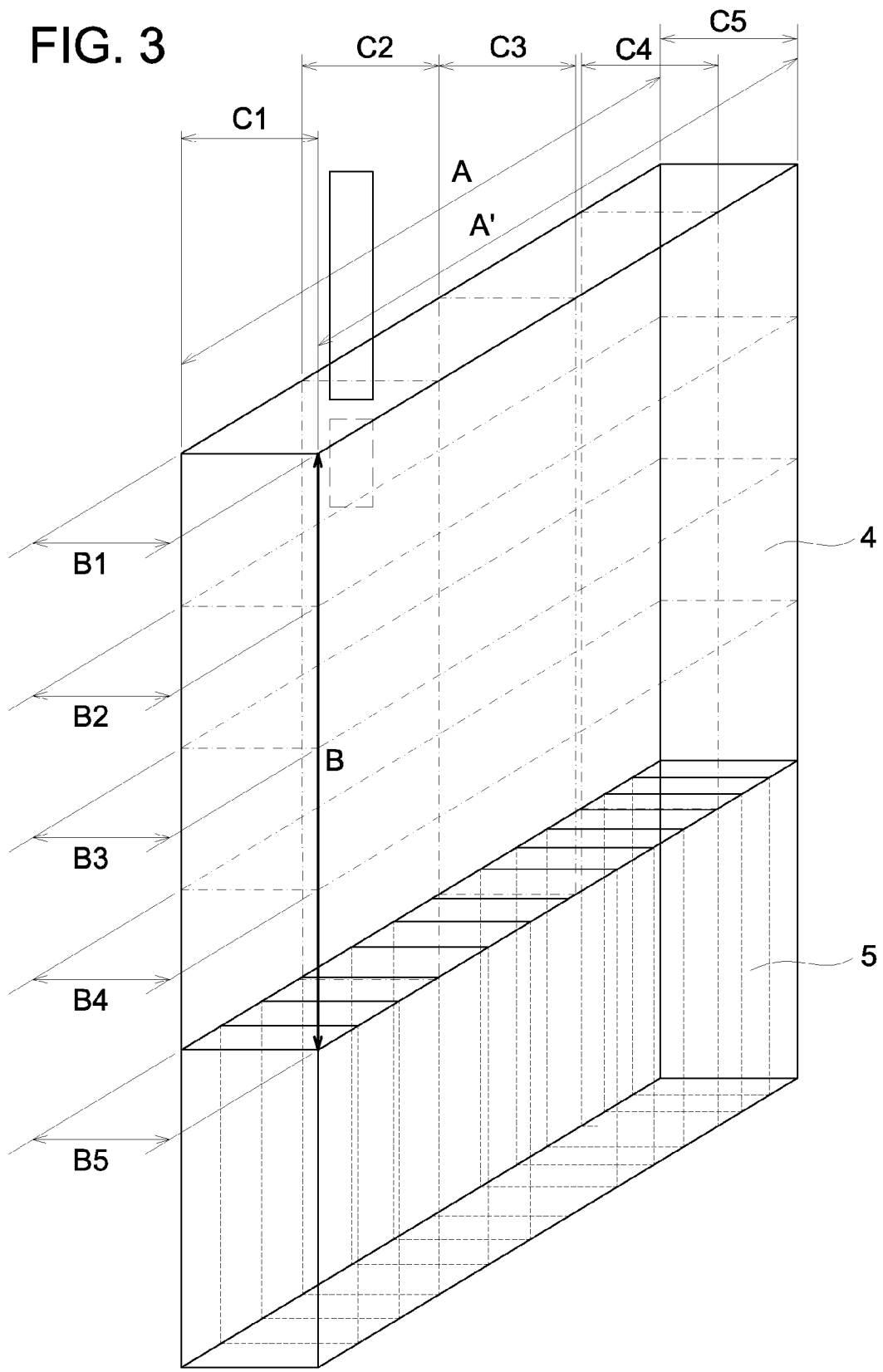

METHOD FOR FORMING INKJET IMAGE WHILE FLOWING THE INK IN AN INK CHAMBER

This application is based on Japanese Patent Application No. 2009-281510 filed on Dec. 11, 2009, in Japanese Patent Office, the entire content of which is hereby incorporated by reference.

FIELD OF TECHNOLOGY

The present invention relates to a method for forming an inkjet image in which an image is formed by using an actinic energy radiation curable inkjet ink.

TECHNICAL BACKGROUND

Heretofore, an actinic radiation curable composition which is cured with an active energy radiation such as a ultraviolet ray and an electron beam, is put in practical use of various applications, such as coating materials (for a plastic, a paper, a woodwork and an inorganic material), an adhesive agent, a printing ink, a print circuit board and an electric insulation.

And as an inkjet ink system which uses these polymerizable compositions, an ultraviolet ray curable inkjet ink which is hardened by an ultraviolet ray is well known. The inkjet recording method using the ultraviolet ray curable ink has been attracting attention in recent years from the point that it dries quickly and it can perform recording to a recording material having no ink absorptivity.

However, with the image forming method which uses an ultraviolet ray curable inkjet ink system, coalescence of adjacent dots which may be a problem during high-speed printing (for example, with a transportation speed of a recording material in the range of 30 m/s or more by using a line recording method, or with a printing speed of 50 m²/hour by using a serial (shuttle) recording method) cannot be fully inhibited. As a result, deterioration of an image causes.

Further, hot-melt ink system which uses 20% or more of phase changeable compound such as wax in ink composition has been attracting attention from the point that it can perform recording to a plain paper having no special treatment or a recording material having no ink absorptivity. However, it has problems that an image formed layer is easily peeled by nail.

Then, in order to solve these problems, radiation curable ink having gelling agent is disclosed (Patent Documents 1 and 2).

On the other hand, it is known that ink is circulated through ink flow path in order to avoid deterioration of an ejection property from inkjet recording head due to bubble in an ink (Patent Document 3).

However, by just print recording an actinic radiation curable ink containing gelling agent with conventional inkjet recording head, it is hard to form a high-resolution image as well as having high curability, because ink cannot be thoroughly gelled after landing onto recording medium resulting in unprinted portions such as hollow defect caused by coalescence of adjacent dots.

Prior Technical Document
Patent Document

Patent Document 1: Unexamined Japanese Patent Application Publication (hereinafter referred to as JP-A) No. 2006-193745

Patent Document 2: Japanese Translation of PCT International Application Publication No. 2009-510184

Patent Document 3: Japanese Translation of PCT International Application Publication No. 2008-513245

SUMMARY OF THE INVENTION

Problems to be Solved by the Present Invention

An object of the present invention is to provide a method for forming an inkjet image in which a high-resolution image can be formed by a stable ink ejection and an inkjet image exhibits excellent curability.

Means to Solve the Problems

The above object has been attained by the following constitutions:

1. A method for forming an inkjet image in which the inkjet image is formed by ejecting an ink composition onto a medium from a nozzle of an inkjet recording head comprising a plurality of pressure chambers, a plurality of nozzles in communication with the pressure chambers and an ink chamber in communication with a side of a plurality of the pressure chamber on which side is opposite to a side of the nozzle of the pressure chamber, and the ink chamber is filled with the ink composition, wherein the ink composition comprises an photo-initiator, a polymerizable compound and a gelling agent; and comprising steps of heat-keeping a temperature of the ink composition in the ink chamber at 70° C.-140° C. during an image recording including during standing-by, and flowing the ink composition in the ink chamber.
2. The method for forming an inkjet image of item 1, wherein a content of the gelling agent in the ink composition is 3-10% by mass, and a flow rate of the ink composition in the heat-keeping and flowing step is 1.0-3.0 m/min.
3. The method for forming an inkjet image of item 1 or 2, wherein the gelling agent is an ester compound of behenic acid or eicosanedioic acid with glycerine or polyglycerine; or an ester compound of behenic acid, isostearic acid and eicosanedioic acid with glycerine.
4. The method for forming an inkjet image of any one of items 1 to 3 comprising a step of curing the ink composition ejected onto the medium.
5. The method for forming an inkjet image of any one of items 1 to 4, wherein the flowing step further comprises a step of stirring the ink composition.

Effects of the Invention

A method for forming an inkjet image can be achieved by the above constitutions in which a high-resolution image can be formed by a stable ink ejection and an inkjet image exhibits excellent curability.

BRIEF DESCRIPTION OF THE DRAWING

FIG. 3 is a schematic perspective view showing an ink chamber.

DESCRIPTION OF THE PREFERRED EMBODIMENT

Figure 1:
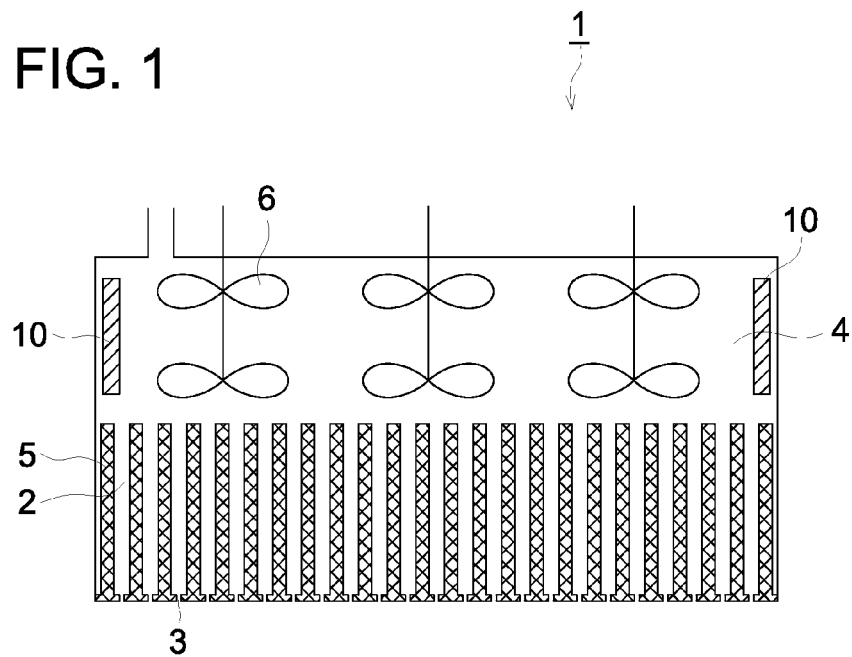
FIG. 1 is a schematic cross-sectional view showing an inkjet recording head of the present invention.

The present invention is characterized in that a method for forming an inkjet image in which the inkjet image is formed by ejecting an ink composition onto a medium from a nozzle of an inkjet recording head comprising a plurality of pressure chambers, a plurality of nozzles in communication with the pressure chambers and an ink chamber filled with the ink composition and in communication with a plurality of the pressure chamber on the opposite side of the nozzle of the pressure chamber, wherein the ink composition comprises an photo-initiator, a polymerizable compound and a gelling agent; and comprising steps of heat-keeping a temperature of the ink composition in the ink chamber at 70° C.-140° C. during an image recording including waiting in printing, and flowing the ink composition in the ink chamber.

According to the present invention, a method for forming an inkjet image can be provided by containing specific amount of gelling agent in an ink composition and the ink is flowed in specific flow rate in the ink chamber in which a high-resolution image can be formed by a stable ink ejection on continuous ejection or during standing-by and an inkjet image exhibits excellent curability.

<Ink Composition>

(Photo Initiator)

As a photo initiator, any photo initiator which are well known in the art and are described in such as "Application and Market of UV•EB Curing Technologies" (C. M. C Shyuppan, supervised by Yoneho Tabata/edited by Radotech Study Group) can be utilized.

As a photo initiator, listed are a photo-acid generator and a photo-radical generator.

As a photo-acid generator, any compound used, for example, for chemical sensitization-type photoresists and photo-cationic polymerization is used (refer to pages 187-192 of "Imaging Yo Yuki Zairyo (Organic Materials Used for Imaging Applications)" edited by Yuki Electronics Zairyo Kenkyukai published by Bunshin Shuppan (1993). Examples of compounds suitable for the present invention will now be listed.

Initially, there can be listed $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium.

Specific examples of such onium compounds usable for the present invention are listed below.

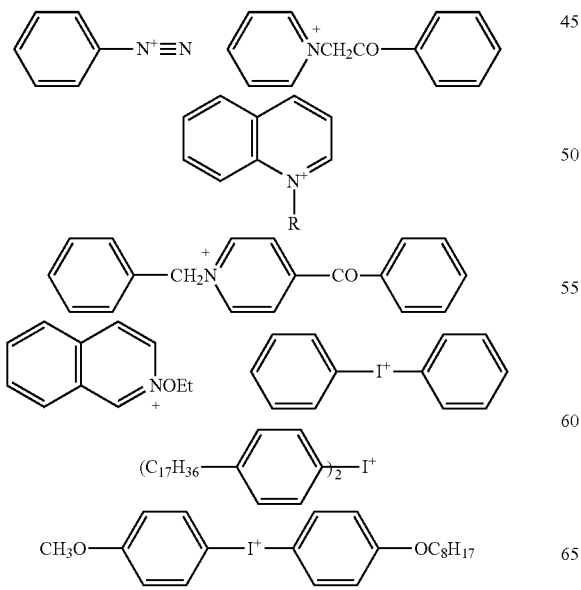

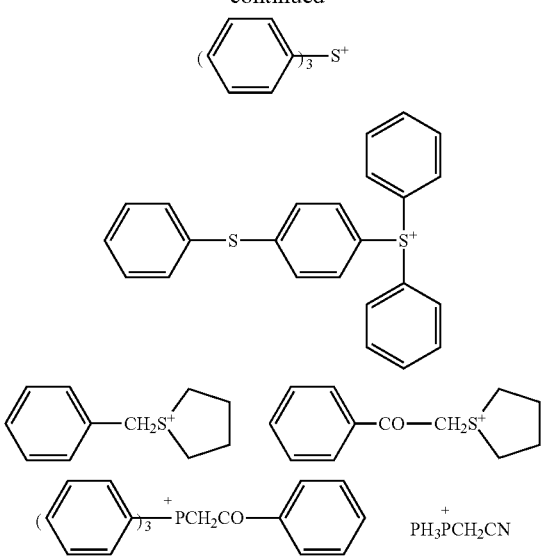

Secondly, sulfonated compounds generating sulfonic acid can be listed and specific compounds will now be exemplified.

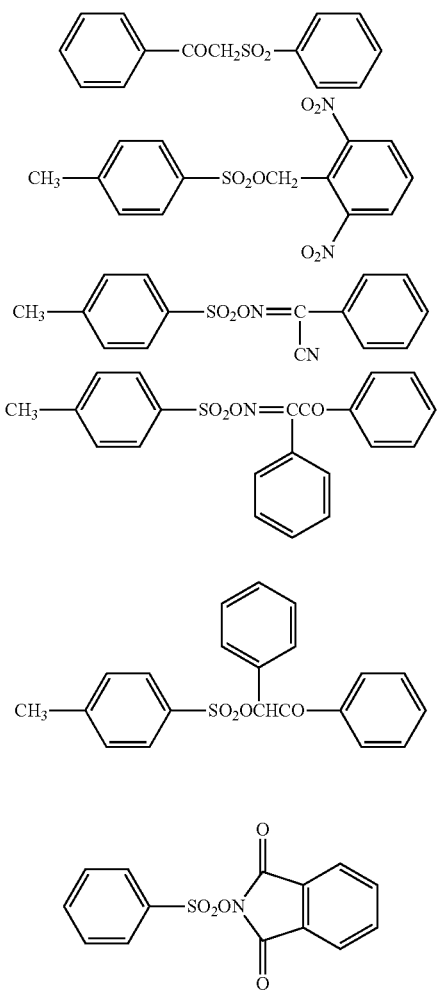

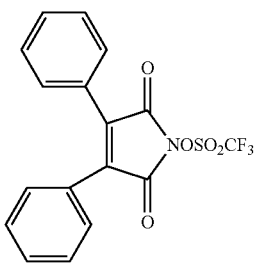
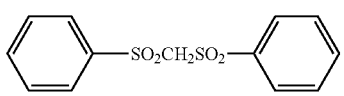
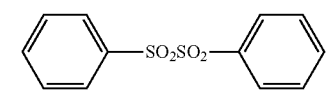
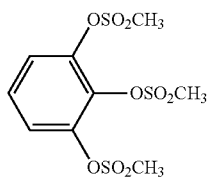

Thirdly, halides photolytically generating hydrogen halides are usable. Specific compounds will now be exemplified.

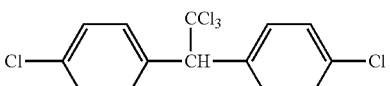
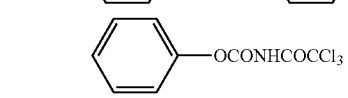
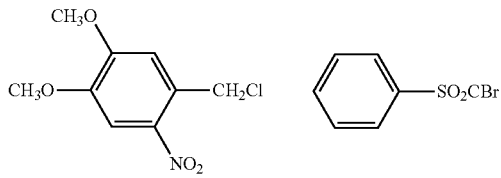
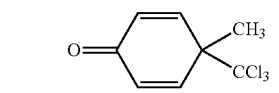
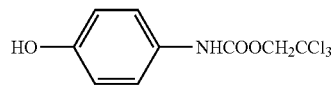
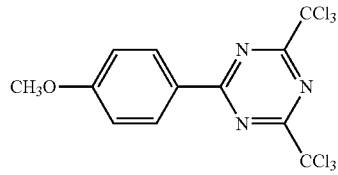

Fourthly, iron-arene complexes can be listed.

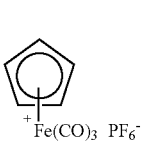
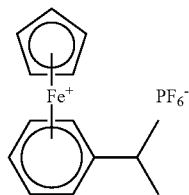

Further, employed as photo-radical generators may be those known in the art, which include aryl alkyl ketones, oxime ketones, thiobenzoic acid S-phenyl, titanocene, aromatic ketones, thioxanthone, benzyl and quinone derivatives, as well as ketocoumarins.

Of these, acylphosphine oxides and acylphosphonates are preferably used in view of sensitivity.

Specifically preferred of the above are bis(2,4,6-trimethylbenzoyl)-phenylphosphine oxides and bis(2,6-dimethoxybenzoyl)-2,4,4-trimethyl-pentylphosphine Further, when considering safety, appropriately employed are 1-hydroxy-cyclohexyl phenyl ketone, 2-methyl-1[4-(methylthio)phenyl-2-morpholinopropane-1-one, bis(2,6-dimethoxybenzoyl)2,4,4-trimethyl-pentylphosphine oxide, and 2-hydoxy-2-methyl-1-phenyl-propane-1-one (DAROCURE (trade name) 1173).

The added amount is preferably 1-10% by mass with respect to the entire ink composition, but is more preferably 2-8% by mass.

Conventional all photo-acid generator can be applicable as a photo generator related to the present invention. So as to add photo initiator into ink composition, preferably used is a solvent which solves it. In this case, for example, as compound for solving photo-acid generator at room temperature (about 25° C.), cyclic ester compounds and carbonic acid ester compounds are preferably employed. Specific example includes ethylene carbonate, propylene carbonate, β-propiolactone, β-butyrolactone, α-methyl-β-butyrolactone, γ-butyrolactone, γ-valerolactone, δ-valerolactone, ε-caprolactone, γ-caprolactone, and γ-heptanolactone. These cyclic ester compounds can be preferably employed in view of effective reversible gelling.

(Polymerizable Compound)

Polymerizable compound of the present invention is a compound which can be polymerized by above photo initiator and all conventional cationically polymerizable compounds and radically polymerizable compounds can be applicable Specific example of cationically polymerizable compound includes styrene derivatives, vinyl ether, oxirane, oxetane, tetrahydrofuran, lactam and Intone compound. Of these, oxirane, oxetane, vinyl ether compound or styrene derivative are preferably used. Especially, in view of curability, vinyl ether compound is preferably used.

As specific examples of monofunctional vinyl ether compounds in vinyl ether compounds, listed are methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methyl cyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydro fulfryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethyleneglycol monovinyl ether, polyethyleneglycol vinyl ether, chloroethyl vinyl ether, chlorobutyl vinyl ether, chloroethoxyethyl vinyl ether, phenylethyl vinyl ether, and phenoxy polyethyleneglycol vinyl ether As specific examples of polyfunctional vinyl ether compounds, listed are divinyl ethers such as ethyleneglycol divinyl ether, diethyleneglycol divinyl ether, polyethyleneglycol divinyl ether, propyleneglycol divinyl ether, butyleneglycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, trimethylolpropane tetravinyl ether, glycerine trivinyl ether, pentaerythritol tetravinyl ether, dipentaerythritol pentavinyl ether, dipentaerythritol hexavinyl ether, trimethylolpropane trivinyl ether ethylene oxide adduct, ditrimethylolpropane trivinyl ether propylene oxide adduct, ditrimethylolpropane tetravinyl ether propylene oxide adduct, pentaerythritol tetravinyl ether ethylene oxide adduct, pentaerythritol tetravinyl ether propylene oxide adduct, and dipentaerythritol hexavinyl ether propylene oxide adduct.

Specific examples of vinyl ether olygomer include bis[4-(vinyloxy)butyl]isophthalate, bis[4-(vinyloxymethyl)cyclohexylmethyl]glutarate, and bis[4-(vinyloxymethyl)cyclohexymethyl]isophthalate. These can be obtained as VEctomer series (VEctomer4010, VEctomer4020, VEctomer4040, VEctomer4060, VEctomer5015) from ALDRICH.

Of vinyl ether compounds, vinyl ether compound having a molecular weight of 300 or more and used in 10% or more by mass is preferred in view of exhibiting effective curability.

As oxirane compound, all conventional epoxy compounds (epoxide) can be applicable.

Specific example of monofunctional epoxide include phenylglycidyl ether, p-tert-butyl phenylglycidyl ether, butylglycidyl ether,2-ethylhexylglycidyl ether, arylglycidyl ether, 1,2-butylene oxide, 1,3-butane monoxide, 1,2-epoxy dodecane, epichlorohydrin, 1,2-epoxy decane, styrene oxide, cyclohexene oxide, 3-methacryloyl oxymethyl cyclohexene oxide, 3-acryloyl oxymethyl cyclohexene oxide, and 3-vinylcyclohexene oxide, Specific example of polyfunctional epoxide include: bisphenol A diglycidyl ether, bisphenol F diglycidyl ether, bisphenol S diglycidyl ether, brominated bisphenol A diglycidyl ether, and brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3',4'-epoxy cyclohexane carboxylate, 2-(3,4-epoxycyclohexyl-5,5-spiro-3,4-epoxy)cyclohexane-meta-dioxane, bis(3,4-epoxycyclohexyl methyl adipate, vinylcyclohexene oxide, 4-vinylepoxy cyclohexane, bis(3,4-epoxy 6-methylcyclohexyl methyl)adipate, 3,4-epoxy 6-methylcyclohexyl-3',4'-epoxy-6'-methylcyclohexane carboxylate, methylene bis(3,4-epoxy cyclohexane), dicyclopentadiene diepoxide, ethylene glycol di(3, 4-epoxycyclohexyl methyl)ether, ethylene bis(3,4-epoxy cyclohexane carboxylate), epoxy hexahydro dioctyl phthalate, epoxy hexahydro phthalic acid di-2-ethylhexyl, 1,4-butanediol diglycidyl ether, 1,6-hexanediol diglycidyl ether, glycerine triglycidyl ether, trimethylol propane triglycidyl ether, polyethyleneglycols diglycidyl ether, polypropyleneglycol diglycidyl ethers, 1,1,3-tetra-decadiene dioxide, limonene dioxide, 1,2,7,8-diepoxyoctane, and 1,2,5,6-diepoxycyclooctane.

Moreover, as compounds having oxetane ring (oxetane compound), all well-known oxetane compounds can be used in combination which is disclosed in JP-A Nos. 2001-220526 and No. 2001-310937.

In oxetane compound of the present invention, specific example of mono-functional oxetane include: 3-ethyl 3-hydroxyrnethyl oxetane, 3-(meth)allyloxymethyl-3-ethyl oxetane, (3-ethyl 3-oxetanyl methoxy)methylbenzene, 4-fluoro [1-(3-ethyl-3-oxetanyl methoxy)methyl]benzene, 4-methoxy-[1-(3-ethyl 3-oxetanyl methoxy)methyl]benzene, [1-(3-ethyl-3-oxetanyl methoxy)ethyl]phenyl ether, isobutoxymethyl(3-ethyl-3-oxetanyl methyl)ether, isobomyl oxyethyl(3-ethyl-3-oxetanyl methyl)ether, isobomyl(3-ethyl-3-oxetanyl methyl)ether, 2-ethylhexyl(3-ethyl-3-oxetanyl methyl)ether, ethyl diethylene-glycol(3-ethyl-3-oxetanyl methyl) ether, dicyclopentadiene(3-ethyl-3-oxetanyl methyl) ether, dicyclopentenyl oxyethyl(3-ethyl-3-oxetanyl methyl) ether, dicyclopentenyl(3-ethyl-3-oxetanyl methyl)ether, tetrahydrofurfuryl(3-ethyl-3-oxetanyl methyl)ether, tetrabromo phenyl(3-ethyl-3-oxetanyl methyl)ether, 2-tetrabromo phenoxy ethyl(3-ethyl-3-oxetanyl methyl) ether, tribromophenyl(3-ethyl-3-oxetanyl methyl)ether, 2-tribromophenoxy ethyl(3-ethyl-3-oxetanyl methyl)ether, 2-hydroxyethyl(3-ethyl-3-oxetanyl methyl) ether, 2-hydroxypropyl(3-ethyl-3-oxetanyl methyl)ether, butoxy ethyl(3-ethyl-3-oxetanyl methyl)ether, pentachlorophenyl(3-ethyl-3-oxetanyl methyl)ether, pentabromophenyl(3-ethyl-3-oxetanyl methyl)ether, and bomyl(3-ethyl-3-oxetanyl methyl)ether.

Specific example of poly-functional oxetane compound include poly-functional oxetane such as 3,7-bis(3-oxetanyl)-5-oxa-nonane, 3,3'-(1,3-(2-methylenyl) propane diyl bis (oxymethylene))bis-(3-ethyl oxetane), 1,4-bis[(3-ethyl-3-oxetanyl methoxy)methyl]benzene, 1,2-bis[(3-ethyl-3-oxetanyl methoxy)methyl]ethane, 1,3-bis[(3-ethyl-3-oxetanyl methoxy)methyl]propane, ethylene glycol bis(3-ethyl-3-oxetanyl methyl)ether, dicyclo pentenyl bis(3-ethyl-3-oxetanyl methyl)ether, triethylene glycol bis(3-ethyl-3-oxetanyl methyl)ether, tetraethylene glycol bis(3-ethyl-3-oxetanyl methyl)ether, tricyclodecane diyl dimethylene(3-ethyl-3-oxetanyl methyl)ether, trimethylol propane tris(3-ethyl-3-oxetanyl methyl)ether, 1,4-bis(3-ethyl-3-oxetanyl methoxy)butane, 1,6-bis(3-ethyl-3-oxetanyl methoxy)hexane, pentaerythritol tris(3-ethyl-3-oxetanyl methyl)ether, pentaerythritol tetrakis(3-ethyl-oxetanyl methyl)ether, polyethylene glycols bis(3-ethyl-3-oxetanyl methyl)ether, dipenta erythritol hexakis(3-ethyl-3-oxetanyl methyl)ether, dipenta erythritol pentakiss(3-ethyl-3-oxetanyl methyl)ether, dipenta erythritol tetrakis(3-ethyl-3-oxetanyl methyl)ether, caprolactone modified dipentaerythritol hexakiss(3-ethyl-3-oxetanyl methyl)ether, caprolactone modified dipentaerythritol pentakis(3-ethyl-3-oxetanyl methyl)ether, ditrimethylol propane tetrakis(3-ethyl-3-oxetanyl methyl)ether, EO modified bisphenol A bis(3-ethyl-3-oxetanyl methyl)ether, PO modified bisphenol A bis(3-ethyl-3-oxetanyl methyl)ether, EO modified hydrogenated bisphenol A bis(3-ethyl-3-oxetanyl methyl)ether, PO modified hydrogenated bisphenol A bis(3-ethyl-3-oxetanyl methyl)ether and EO modified bisphenol F (3-ethyl-3-oxetanyl methyl)ether.

As a radically polymerizable compound, all of conventional (meth)acrylate monomer and/or olygomer can be applicable. Herein, "and/or" means that a radically polymerizable compound may contain singly used monomer or singly used olygomer or mixture of these. An item described below is similarly defined.

As a compound having (meth)acrylate group, listed are mono-functional monomers such as isoamyl acrylate, stearyl acrylate, lauryl acrylate, octyl acrylate, decyl acrylate, iso miristyl acrylate, iso stearyl acrylate, 2-ethylhexyl diglycol acrylate, 2-hydroxy butyl acrylate, 2-aciyloyloxy ethyl hexahydro phthalic acid, butoxy ethyl acrylate, ethoxy diethyleneglycol acrylate, methoxy diethyleneglycol acrylate, methoxy polyethylene glycols acrylate, methoxy propylene glycol acrylate, phenoxy ethyl acrylate, tetrahydrofurfuryl acrylate, isobornyl acrylate, 2-hydroxyethyl acrylate, 2-hydroxypropyl acrylate, 2-hydroxy-3-phenoxy propyl acrylate, 2-aciyloyloxy ethyl succinate, 2-acryloyloxy ethyl phthalate, 2-acryloyloxy ethyl 2-hydroxyethyl phthalate, lactone modified flexible acrylate and t-butyl cyclohexyl acrylate; bi-functional monomers such as triethylene glycol diacrylate, tetraethylene glycol diacrylate, polyethylene glycol diacrylate, tripropylene glycol diacrylate, polypropylene-glycol diacrylate, 1,4-butanediol diacrylate, 1,6-hexanediol diacrylate, 1,9-nonane diol diacrylate, neopentyl glycol diacrylate, dimethylol-tricyclo decane diacrylate, EO adduct diacrylate of bisphenol A, PO adduct diacrylate of bisphenol A, hydroxy pivalic acid neo pentyl glycol diacrylate and poly tetramethylene glycol diacrylate; and poly-functional monomers of having three or more functional group such as trimethylol propane tri acrylate, EO modified trimethylol propane tri acrylate, pentaerythritol triacrylate, pentaerythritol tetraacrylate, dipentaerythritol hexa acrylate, ditrimethylol propane tetra-acrylate, glycerine propoxy tri acrylate, caprolactone modified trimethylol propane tri acrylate, pentaerythritol ethoxy tetra-acrylate, and caprolactam modified dipentaerythritol hexa acrylate.

In addition, polymerizable oligomers can be blended as well as monomers. As a polymerizable oligomer, cited are epoxy acrylate, aliphatic urethane acrylate, aromatic series urethane acrylate, polyester acrylates, and straight chain acrylic oligomer.

Of these monomers, in view of causing sensitivity, skin irritation, eye stimulativeness, mutagenicity, or toxicity, especially preferred is: isoamyl acrylate, stearyl acrylate, lauryl acrylate, octyl acrylate, decyl acrylate, iso miristyl acrylate, iso stearyl acrylate, ethoxy diethylene-glycol acrylate, methoxy polyethylene glycols acrylate, methoxy propylene glycol acrylate, isobornyl acrylate, lactone modified flexibile acrylate, tetraethylene glycol diacrylate, polyethylene glycols diacrylate, polypropylene-glycol diacrylate, EO modified trimethylol propane tri acrylate, dipentaerythritol hexa acrylate, ditrimethylolpropane tetra-acrylate, glycerine propoxy tri acrylate, caprolactone modified trimethylol propane tri acrylate, pentaerythritol ethoxy tetra-acrylate and caprolactam modified dipentaerythritol hexa acrylate.

Further, of these, especially in case of using EO modified trimethylol propane in acrylate, glycerine propoxy tri acrylate, EO modified pentaerythritol tri acrylate, caprolactone modified trimethylol propane tri acrylate, and caprolactam modified dipentaerythritol hexa acrylate in 15% or more by mass based on total ink as a polymerizable compound, remarkable curability can be obtained by a constitution of the present invention, and preferably resulting in realizing excellent curability and image quality stably.

According to the present invention, a combination of vinyl ether monomer and/or olygomer and (meth)acrylate monomer and/or olygomer as polymerizable compound is preferred in view of having good curability. In case of combination, the effect of the present invention becomes large.

Further, in view of curability and ejection stability, above vinyl ether monomer or vinyl ether oligomer having cyclohexyl group is preferable embodiment.

Content of polymerizable compound based on ink composition is preferable from 65% by mass to 95% by mass, especially preferable from 70% by mass to 90% by mass.

(Gelling Agent)

Gelling agent according to the present invention refers to a compound which can reversibly gel an ink composition.

Next, a gelling agent which can reversibly gel an ink composition will be described.

"Gel state" according to the present invention refers to a collective structure of solute by loosing independent mobility as a result of an interaction such as a lamella structure, a polymer network with a covalent bond or a hydrogen bond, a polymer network formed by a physical coagulation, and a coagulation structure of fine particles, and a state of solidification or half-solidification accompanied by a rapid viscosity increasing or a remarkable elasticity increasing.

"Gel state" formed by compound which can reversibly gel an ink composition according to the present invention is a heat reversible gel which converts to a solution having fluidity (referred to as a sol) by heating. Namely, the ink composition used in the present invention can heat-reversibly transit between gel state and liquid state and the cycle of re-forming gel can be repeated in several times.

Specific example of the ink composition the present preferably used in the present invention which can be gelled irreversibly include: fatty-acid alcohol such as Stearone (18-PENTATRIACONTANONE), 16-HENTRIACONTANONE, 12-TRICOSANONE and UNILIN425; fatty acid ester, Stearoyl inulin—fatty-acid dextrin (available as Rheopearl series from Chiba Flour Milling Co., Ltd), L-glutamine acid derivative (available from Ajinomoto-Fine-Techno Co., Inc.), fatty acid amide (urethane), Jojoba esters (Floraester70 available from Ikeda Corporation), oil gelling agent described in JP-A Nos. 2005-126507 and JP-A No. 2005-255821, oligoester based gelling agent comprising (A) glycerin or glycerin condensate, (B) fatty acid having carbon number of 16 to 24 and (C) dibasic acid having carbon number of 18 to 22 carbon atoms. Of these, preferred is saturated or unsaturated mono amide having carbon number of 16-24 and oligoester, in view of inhibiting coalescence of dots. Specific examples of saturated or unsaturated mono amide having carbon number of 16-24 include stearic acid amide (FATTY AMIDE T produced by Kao Corporation, NEUTRON-2 produced by Nippon Fine Chemical Co., Ltd.), and ERUCAMIDE (FATTY AMIDE E produced by Kao Corporation). Specific examples of oligoester based gelling agent include ester compound of behenic acid and eicosane diacid with glycerin or polyglycerin or ester compounds of behenic acid, isostearic acid and eicosane diacid with glycerin and it is preferable in view of large effect of the present invention. For example, behenic acid/eicosane diacid glyceryl (Nomucoat HK-G, produced by Nisshin OilliO, Ltd.), behenic acid/eicosane diacid poly glyceryl (Nomucoat HK-P, produced by Nisshin OilliO, Ltd.) and behenic acid/isostearic acid/eicosane diacid glyceryl (Nomucoat SG, produced by Nisshin OilliO, Ltd.).

According to the invention, in view of ejection stability and prevention of heat polymerization, a phase transfer temperature by sol-gel of an ink composition is preferable 40° C. or more and 100° C. or less, more preferably 45° C. or more and 80° C. or less. When ink composition has a phase transfer temperature of 40° C. or more, stable ink ejection without coalescence of dots can be obtained without depending on a temperature of printing circumstances. The phase transfer temperature of ink composition is evaluated by the temperature at which a viscosity changes rapidly from a fluid solution state to a gel state by viscoelastisity measuring apparatus Physica MCR301 at shear rate of 20 (l/s).

In view of gelling property, curability and ejection stability, a content of gelling agent to ink composition is preferable from 3% by mass to 10% by mass, more preferable from 5% by mass to 10% by mass. In case that the content of gelling agent to ink composition is less than 3% by mass, ink cannot be thoroughly gelled after landing onto recording medium. Therefore, it is difficult to form high-resolution image due to imprinted portions such as hollow defect caused by coalescence of adjacent dots. In case that the content of gelling agent to ink composition is more than 10% by mass, ink ejection becomes unstable and durability of an image layer after radiation curing is inferior. For example, as well as hot-melt ink in which main component is phase-changeable compound by heat such as wax, pencil hardness becomes extremely poor.

Patent Documents 1 and 2 introduce a radiation curable ink which uses small amount of gelling agent and inhibits hollow defect caused by coalescence of adjacent dots, resulting in durable layer by radiation curing. However, as described later, in these Documents, no problems and solution methods are disclosed or suggested which relates to unprinted portions such as hollow defect caused by ejection instability on continuous ejection or during standing-by, when ink having polymerizable compound as main component includes small amount of gelling agent such as 3-10% by mass.

The ink composition may be used in combination with a basic compound in terms of enhancing ejection stability.

As the basic compound, the various known basic compounds may be used. Typical examples thereof include basic alkali metal compounds, basic alkali earth metal compounds, and basic organic compounds such as an amine.

As the basic alkali metal compounds, listed are alkali metal hydroxides (such as lithium hydroxide, sodium hydroxide and potassium hydroxide), alkali metal carbonates (such as lithium carbonate, sodium carbonate and potassium carbonate), and alkali metal alcoholates (such as sodium methoxide, sodium ethoxide, potassium methoxide and potassium ethoxide).

As the basic alkaline earth metal compounds, listed are alkaline earth metal hydroxides (such as magnesium hydroxide and calcium hydroxide), alkaline earth metal carbonates (such as magnesium carbonate and calcium carbonate), and alkaline earth metal alcoholates (such as magnesium methoxide).

As the basic organic compounds, listed are amines and nitrogen containing heterocyclic compounds such as quinoline and quinolizine. Of these, amines are preferable from the viewpoint of compatibility with a photo-polymerizable monomer, for example, listed are octylamine, naphthylamine, xylenediamine, dibenzylamine, diphenylamine, dibutylamine, trioctylamine, tetramethyl ethylenediamine, tetramethyl-1,6-hexamethylenediamine, hexamethylenetetraniine, and triethanolamine.

The concentration of the basic compound is 10 to 50,000 ppm by mass, and preferably 100 to 5000 ppm by mass, based on the total weight of the photo-polymerizable monomer. The basic compound may be used alone or in combinations of a plurality thereof.

Ink composition preferably contains several species of conventional dyes and/or pigments, especially pigments.

Specific examples of pigment applicable to the present invention are listed below.

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213;

C.I. Pigment Red 5, 7, 12, 22, 38, 48:1, 48:2, 48:4, 49:1, 53:1, 57:1, 63:1, 101, 112, 122, 123, 144, 146, 168, 184, 185, 202;

C.I. Pigment Violet 19, 23;

C.I. Pigment Blue 1, 2, 3, 15:1, 15:2, 15:3, 15:4, 18, 22, 27, 29, 60;

C.I. Pigment Green 7, 36;

C.I. Pigment White 6, 18, 21;

C.I. Pigment Black 7

To disperse the above-described pigment, for example, a ball mill, a sand mill, an attritor mill, a roll mill, an agitator, a Henshel. mixer, a colloidal mixer, a ultrasonic homogenizer, a pearl mill, a wet jet mill, a paint shaker can be utilized. Further, at the time of dispersion of pigment, a dispersant can be added. As a dispersant, a polymer dispersant is preferably utilized, and a polymer dispersant includes such as SOLSPERSE sines of Avecia Corp. and PB sires of Ajinomoto Fine-Techno Co., Inc.

Further, a synergist as a dispersion aid may be employed depending on various types of pigment. These dispersants and dispersion aids are preferably added at 1-50 parts by mass against 100 parts y mass of pigment. As a dispersion medium, a solvent or a polymerizing compound is utilized; however, in an actinic energy radiation curable ink composition of this invention, non-solvent is preferable so as to react to cure immediately after ink landing. When a solvent remains in a cured image, there caused deterioration of solvent resistance and a problem of VOC of a residual solvent. Therefore, it is preferable to select not a solvent but a polymerizing compound as a dispersion medium, and more preferably to select monomer having the lowest viscosity among them, with respect to dispersion adaptability.

In dispersion of a pigment, selection of a pigment, a dispersant and a dispersion medium, dispersion conditions and filtering conditions are suitably set so as to make a mean particle diameter of a pigment of preferably from 0.08 to 0.2 µm and the maximum particle diameter of from 0.3 to 10 µm and preferably from 0.3 to 3 µm. By this particle diameter control, it is possible to depress clogging of a head nozzle and maintain keeping stability of ink, as well as transparency and curing sensitivity of ink.

In ink according to the invention, colorant concentration is preferably from 1% by mass to 10% by mass based on the total ink.

Even though reasons why the image forming method of the present invention exhibits excellent curability and ejection stability were not understood in detail, the reason is presumed as follows:

It is assumed that curable ink composition containing gelling agent tends to have high affinity between polar group of polymerizable compound and polar group of gelling agent, resulting in invisible phase separation which causes bad ejection. The constitution of the present invention may be assumed to inhibit this tendency of the affinity between polar groups. These phenomena are remarkably noted when ink having polymerizable compound as main component inch ides saturated or unsaturated mono amide gelling agent having carbon number of 16-24 or oligoester based gelling agent which have excellent inhibiting effect to coalescence of dots. So as to obtain excellent images stably by using these gelling agents, the constitution of the present invention has to be necessary.

In the present invention, the affinity between above polar groups can be effectively inhibited by keeping the flow rate in predetermined range by controlling the content of gelling agent even at waiting time for printing in which printing is not performed.

Further, this inhibition may be extremely effective, specially when ink composition contains at least one of (meth) acrylate monomer and (meth)acrylate oligomer and at least one of vinylether monomer and vinylether oligomer and moreover above vinylether monomer or vinylether oligomer contains cyclohexyl group.

(Inkjet Recording Head)

Inkjet recording head will now specifically be described with reference to the accompanying FIG. 1.

Inkjet recording head 1 has a plurality of pressure chambers 2 and a plurality of nozzles 3 and ink chambers 4.

A plurality of nozzles 3 communicates with a plurality of pressure chambers 2, respectively. Ink chamber 4 locates at an opposite side of nozzles and communicates with a plurality of pressure chambers 2 and is filled with ink composition.

Each pressure chamber 2 is separated by partition wall 5. Partition wall 5 has piezoelectric element which is a piezoelectric material having electrode. Ink composition can be ejected by a motion of this piezoelectric element.

Further, inkjet recording head has a heating member 10. By controlling heat generation by a heating member 10, temperature of ink composition in the ink chamber can be kept from 70° C. to 140° C.

(Image Forming Method)

In the inkjet recording method according to the present invention, an image is formed by ejecting ink composition from nozzle onto a medium and curing the ink composition ejected to print onto the medium.

The inkjet recording method according to the present invention includes steps of heating and flowing during image formation including standing-by period in which the ink composition in the ink chamber is kept flowing as well as a temperature of the ink composition in the ink chamber is kept at 70° C. to 140° C.

According to the present invention, "during image formation" refers to as a period in which an ink composition is ejected to print from nozzles for forming image onto the medium and also including a period without printing which exists between periods of printing by ejecting ink composition from nozzle.

Namely, "during ink formation" refers to as the period at least between start and end of image forming onto medium. Preferable embodiment is a period from switching-on an electric source of inkjet recording apparatus having inkjet recording head to switching-off the same.

"To flow an ink composition in an ink chamber as well as keeping a temperature of an ink composition in an ink chamber at 70° C. to 140° C." means that a temperature of an ink composition is kept at 70° C. to 140° C. and flowed, in all units in each portion defined below in the ink chamber.

"To flow ink composition" means that the ink composition is flowed in the flow rate of 1.0 m/min or more in all units in each portion in the recording head by measuring method below.

"Unit portion" means one block separated into 16 by each plane of B1, B2, B3, B4 and B5 parallel to the upper plane of the pressure chamber (ink inlet side) which separate ink chamber into quarter and by each plane of C1-C5 which are perpendicular both to B1-B5 and a plane A, A' along with a plurality of nozzles and further perpendicular to B1-B5 and separate ink chamber into quarter.

FIG. 3 shows an example of the units.

According to the present invention, the ink composition has to be flowed at flow rate of 1.0 m/min or more in all units at least during standing-by period for ink printing. In case that flow rate of the ink composition is less than 1.0 m/min, phase separation between polymerizable compound and gelling agent cannot be thoroughly prevented, resulting in unstable ejection.

Further, in view of stable ejection due to uniform ink supply to each nozzle, flow rate is preferably 3.0 m/min or less. In case that flow rate of the ink composition is more than 3.0 m/min, ink supply to each nozzle cannot be uniform, resulting in unstable ejection.

Figure 2:
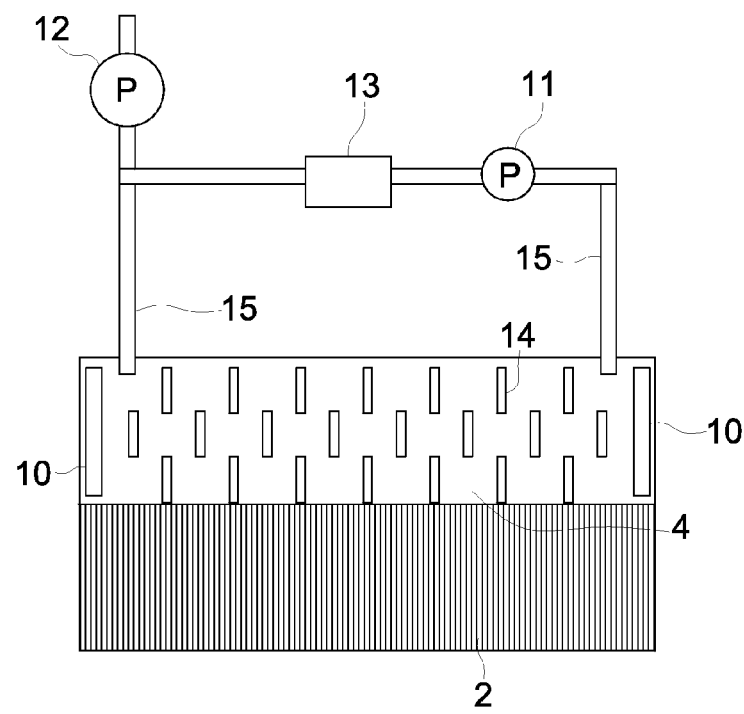
FIG. 2 is another schematic cross-sectional view showing an inkjet recording head of the present invention.

Examples of method for flowing an ink composition in a ink chamber include a method in which stirring blade 6 illustrated in FIG. 1 is provided and rotated in the ink chamber and ink composition in ink chamber is flowed by stirring, and a method in which ink baffle plates are provided in the ink chamber as well as providing an ink circulation path as illustrated in FIG. 2.

Flowing state of an ink in an ink chamber can be measured, for example, by using FtrPIV (PIV: Particle Image Velocimetry)—Micro system manufactured by FLOWTECH RESEARCH. Distribution of flow rate at each unit described above in a flow field can be evaluated in each micro scale by providing a head by using transparent material as an outside material.

Temperature of the ink composition in the ink chamber has to be kept at 70° C. to 140° C., especially preferably at 80° C. to 110° C.

In each pressure chamber 2, piezoelectric element deforms to apply a pressure to ink, and ink drop is ejected from nozzle 3. Ink consumed in each pressure chamber 2 is filled up from an ink chamber 4.

In the image forming apparatus having the inkjet recording head of the present invention, for example, in case of forming multi-color image, number of recording head for each color depends on a nozzle density of used head and a resolution of printing.

For example, in case of forming an image having resolution of 1440 dpi by using a head of drop size 2 pl and nozzle density 360 dpi, an image of 1440×1440 dpi can be formed by using staggered arranged 4 recording heads.

In case of forming an image having resolution of 720×720 dpi by using a head of drop size 6 pl and nozzle density 360 dpi, an image of 720 dpi can be formed by using staggered arranged 2 recording heads. Herein, dpi means a number of dots per 2.54 cm.

In a curing step of the present invention, ink composition ejected onto medium is cured by radiation of actinic energy radiation.

For example, a radiation light from a light source is used to form curing which can emit high intensity UV light of 100 mW/cm$^2$ or more such as metal halide lump, high pressure mercury lump and LED.

EXAMPLES

Embodiments of the present invention will now be specifically described with the reference to examples, however the present invention is not limited thereto.

<<Preparation of Pigment Dispersion>>

Pigment was dispersed by using following composition.

Two kinds of compounds below were put into stainless beaker, and dissolved by stirring 1 hour while heating at 65° C. on a hot plate.

| | |
|---|---|
| SOLSPERSE28000 (Dispersant produced by Lubrizol) | 9 parts |
| CHDMVE (1,4-cyclohexane dimethanol divinyl ether produced by NIPPON CARBIDE INDUSTRIES CO., INC) | 71 parts |

After cooling to room temperature, 20 parts of pigment below was added to above. Into glass bottle, above composition were put with 200 g of zirconia beads having 0.5 mm diameter followed by sealing and dispersing in following hours by paint shaker. Zirconia beads were eliminated after dispersion treatment.

| | |
|---|---|
| Pigment dispersion 1: Pigment Black 7 (#52 produced by Mitsubishi Chemical Corporation) | 5 hours |
| Pigment dispersion 2: Pigment Blue 15:4 (CHROMOFINE BLUE 6332JC produced by Dainichiseika Color & Chemicals Mfg. Co., Ltd. ) | 5 hours |
| Pigment dispersion 3: Pigment Yellow 150 (E4GN-GT CH20015 produced by LANXESS) | 8 hours |
| Pigment dispersion 4: Pigment Red 122 (CHROMOFINE RED 6112JC produced by Dainichiseika Color & Chemicals Mfg. Co., Ltd.) | 8 hours |

Further, Pigment dispersions 5-8 were prepared in the same manner as above except for using PB824 (produced by Ajinomoto Fine-Techno Co., Inc.) instead of SOLSPERSE 28000 and TEGVE (triethyleneglycol divinyl ether produced by NIPPON CARBIDE INDUSTRIES CO., INC) instead of CHDMVE.

<<Preparation of Ink Composition>>

Ink compositions 1-72 listed in Table 8 and 9 were prepared by combination of Ink compositions listed in Table 1-7 and Gelling agents listed in Table 8 and 9, followed by filtering via 3 μm Teflon (trademark) membrane-filter produced by ADVANTEC.

As comparative example, used were hot-melt type YMCK Inks for Phaser 860 produced by Xerox Corporation in which a gelling agent such as wax was used as major component of the ink.

TABLE 1

Ink composition 1

| | | Pigment dispersion | | | |
|---|---|---|---|---|---|
| | | K | C | M | Y |
| | | 5 | 6 | 8 | 7 |
| | | 12.5 | 12.5 | 21.0 | 15.0 |
| Polymerizable compound | N-vinyl caprolactam (Tokyo Kasei) | 28.3 | 28.3 | 19.8 | 25.8 |
| Polymerizable compound | Phenoxyethyl acrylate V #192 (OSAKA ORGANIC CHEMICAL INDUSTRY LTD.) | 10.0 | 10.0 | 10.0 | 10.0 |
| Polymerizable compound | Polyethyleneglycol acrylate A-400 (Osaka Yuki) | 10.0 | 10.0 | 10.0 | 10.0 |
| Polymerizable compound | Caprolactone modified dipentaerythritol hexaacrylate DPCA-30 (Nippon Kayaku Co., Ltd.) | 15.0 | 15.0 | 15.0 | 15.0 |
| Polymerizable compound | Urethane acrylate CA2901 (Sartomer) | 10.0 | 10.0 | 10.0 | 10.0 |
| Gelling agent | Shown in Table 8 | 5.0 | 5.0 | 5.0 | 5.0 |
| Surfactant | X-22-4272 (Shin-Etsu Chemical Co., Ltd.) | 0.2 | 0.2 | 0.2 | 0.2 |
| Photo initiator | DAROCURE TPO (Ciba) | 4.0 | 4.0 | 4.0 | 4.0 |
| Photo initiator | IRGACURE 184 (Ciba) | 4.0 | 4.0 | 4.0 | 4.0 |
| Auxiliary for sensitizer | KayacureEPA (Nippon Kayaku Co., Ltd) | 1.0 | 1.0 | 1.0 | 1.0 |

TABLE 2

Ink composition 2

| | | Pigment dispersion | | | |
|---|---|---|---|---|---|
| | | K | C | M | Y |
| | | 1 | 2 | 4 | 3 |
| | | 12.5 | 12.5 | 21.0 | 15.0 |
| Polymerizable compound | CHDMVE (NIPPON CARBIDE INDUSTRIES CO., INC) | 51.4 | 51.4 | 42.9 | 48.9 |
| Polymerizable compound | VEctomer2020 (ALDRICH) | 15.0 | 15.0 | 15.0 | 15.0 |
| Gelling agent | Shown in Table 8 | 5.0 | 5.0 | 5.0 | 5.0 |
| Surfactant | KF-351A (Shin-Etsu Chemical Co., Ltd.) | 0.1 | 0.1 | 0.1 | 0.1 |
| Photo initiator | CPI-100P (Propylene carbonate 50% solution, SAN-APRO Ltd.) | 4.0 | 4.0 | 4.0 | 4.0 |
| Solvent for Photo initiator | Propylene carbonate (Maruzen) | 10.0 | 10.0 | 10.0 | 10.0 |
| Sensitizer | DEA (KAWASAKI KASEI CHEMICALS Ltd.) | 2.0 | 2.0 | 2.0 | 2.0 |

TABLE 3

| | Ink composition 3 | | | | |
|---|---|---|---|---|---|
| | | \multicolumn{4}{c}{Pigment dispersion} |
| | | K<br>5<br>12.5 | C<br>6<br>12.5 | M<br>8<br>21.0 | Y<br>7<br>15.0 |
| Polymerizable compound | TEGVE (NIPPON CARBIDE INDUSTRIES CO., INC) | 46.4 | 46.4 | 37.9 | 43.9 |
| Polymerizable compound | VEctomer4040(ALDRICH) | 20.0 | 20.0 | 20.0 | 20.0 |
| Gelling agent | Shown in Table 8 | 5.0 | 5.0 | 5.0 | 5.0 |
| Surfactant | KF-351A (Shin-Etsu Chemical Co., Ltd.) | 0.1 | 0.1 | 0.1 | 0.1 |
| Photo initiator | CPI-100P (Propylene carbonate 50% solution, SAN-APRO Ltd.) | 4.0 | 4.0 | 4.0 | 4.0 |
| Solvent for Photo initiator | Propylene carbonate (Maruzen) | 10.0 | 10.0 | 10.0 | 10.0 |
| Sensitizer | DEA (KAWASAKI KASEI CHEMICALS Ltd.) | 2.0 | 2.0 | 2.0 | 2.0 |

TABLE 4

| | Ink composition 4 | | | | |
|---|---|---|---|---|---|
| | | \multicolumn{4}{c}{Pigment dispersion} |
| | | K<br>1<br>12.5 | C<br>2<br>12.5 | M<br>4<br>21.0 | Y<br>3<br>15.0 |
| Polymerizable compound | CHDMVE(NIPPON CARBIDE INDUSTRIES CO., INC) | 62.4 | 62.4 | 53.9 | 59.9 |
| Polymerizable compound | VEctomer2020(ALDRICH) | 15.0 | 15.0 | 15.0 | 15.0 |
| Gelling agent | Shown in Table 8 | 5.0 | 5.0 | 5.0 | 5.0 |
| Surfactant | KF-351A (Shin-Etsu Chemical Co., Ltd.) | 0.1 | 0.1 | 0.1 | 0.1 |
| Photo initiator | CPI-210S (SAN-APRO Ltd.) | 3.0 | 3.0 | 3.0 | 3.0 |
| Sensitizer | DEA (KAWASAKI KASEI CHEMICALS Ltd.) | 2.0 | 2.0 | 2.0 | 2.0 |

TABLE 5

| | Ink composition 5 | | | | |
|---|---|---|---|---|---|
| | | \multicolumn{4}{c}{Pigment dispersion} |
| | | K<br>5<br>12.5 | C<br>6<br>12.5 | M<br>8<br>21.0 | Y<br>7<br>15.0 |
| Polymerizable compound | TEGVE (NIPPON CARBIDE INDUSTRIES CO., INC) | 47.4 | 47.4 | 38.9 | 44.9 |
| Polymerizable compound | VEctomer4040(ALDRICH) | 20.0 | 20.0 | 20.0 | 20.0 |
| Polymerizable compound | Polyfunctional vinyl ether TMPEOVE-60 EO = 6 (NIPPON CARBIDE INDUSTRIES CO., INC) | 10.0 | 10.0 | 10.0 | 10.0 |
| Gelling agent | Shown in Table 8 | 5.0 | 5.0 | 5.0 | 5.0 |
| Surfactant | KF-351A ((Shin-Etsu Chemical Co., Ltd.) | 0.1 | 0.1 | 0.1 | 0.1 |
| Photo initiator | CPI-210S (SAN-APRO Ltd.) | 3.0 | 3.0 | 3.0 | 3.0 |
| Sensitizer | DEA (KAWASAKI KASEI CHEMICALS Ltd.) | 2.0 | 2.0 | 2.0 | 2.0 |

TABLE 6

| | Ink composition 6 | | | | |
|---|---|---|---|---|---|
| | | \multicolumn{4}{c}{Pigment dispersion} |
| | | K<br>5<br>12.5 | C<br>6<br>12.5 | M<br>8<br>21.0 | Y<br>7<br>15.0 |
| Polymerizable compound | TEGVE (NIPPON CARBIDE INDUSTRIES CO., INC) | 30.4 | 30.4 | 21.9 | 27.9 |

TABLE 6-continued

| | Ink composition 6 | | | | |
|---|---|---|---|---|---|
| | | Pigment dispersion | | | |
| | | K 5 12.5 | C 6 12.5 | M 8 21.0 | Y 7 15.0 |
| Polymerizable compound | VEctomer4040 (ALDRICH) | 10.0 | 10.0 | 10.0 | 10.0 |
| Polymerizable compound | Polyfunctional vinyl etherTMPEOVE-60 EO = 6 (NIPPON CARBIDE INDUSTRIES CO., INC) | 10.0 | 10.0 | 10.0 | 10.0 |
| Polymerizable compound | Caprolactone modified dipentaerythritol hexaacrylate DPCA-30 (Nippon Kayaku Co., Ltd.) | 15.0 | 15.0 | 15.0 | 15.0 |
| Gelling agent | Shown in Table 8 | 5.0 | 5.0 | 5.0 | 5.0 |
| Surfactant | KF-351A ((Shin-Etsu Chemical Co., Ltd.) | 0.1 | 0.1 | 0.1 | 0.1 |
| Photo initiator | CPI-100P (Propylene carbonate 50% solution, SAN-APRO Ltd.) | 5.0 | 5.0 | 5.0 | 5.0 |
| Solvent for Photo initiator | Propylene carbonate (Maruzen) | 10.0 | 10.0 | 10.0 | 10.0 |
| Sensitizer | DEA (KAWASAKI KASEI CHEMICALS Ltd.) | 2.0 | 2.0 | 2.0 | 2.0 |

TABLE 7

| | Ink composition 7 | | | | |
|---|---|---|---|---|---|
| | | Pigment dispersion | | | |
| | | K 5 12.5 | C 6 12.5 | M 8 21.0 | Y 7 15.0 |
| Polymerizable compound | TEGVE (NIPPON CARBIDE INDUSTRIES CO., INC) | 37.4 | 37.4 | 28.9 | 34.9 |
| Polymerizable compound | VEctomer4040 (ALDRICH) | 15.0 | 15.0 | 15.0 | 15.0 |
| Polymerizable compound | Polyfunctional vinyl etherTMPEOVE-60 EO = 6 (NIPPON CARBIDE INDUSTRIES CO., INC) | 10.0 | 10.0 | 10.0 | 10.0 |
| Polymerizable compound | Caprolactone modified dipentaerythritol hexaacrylate DPCA-30 (Nippon Kayaku Co., Ltd) | 15.0 | 15.0 | 15.0 | 15.0 |
| Gelling agent | Shown in Table 8 | 5.0 | 5.0 | 5.0 | 5.0 |
| Surfactant | KF-351A (Shin-Etsu Chemical Co., Ltd.) | 0.1 | 0.1 | 0.1 | 0.1 |
| Photo initiator | CPI-210S (SAN-APRO Ltd.) | 3.0 | 3.0 | 3.0 | 3.0 |
| Sensitizer | DEA (KAWASAKI KASEI CHEMICALS Ltd.) | 2.0 | 2.0 | 2.0 | 2.0 |
| | Ink composition 8 | | | | |
| | | Pigment dispersion | | | |
| | | K 5 12.5 | C 6 12.5 | M 8 21.0 | Y 7 15.0 |
| Polymerizable compound | PEG#400 Diacrylate A-400 (Shin-Nakamura Kagaku) | 31.4 | 31.4 | 17.9 | 28.9 |
| Polymerizable compound | VEctomer4040 (ALDRICH) | 15.0 | 15.0 | 15.0 | 15.0 |
| Polymerizable compound | EO modified trimethylolpropane triacrylate SR499 (Sartomer) | 17.0 | 17.0 | 17.0 | 17.0 |
| Polymerizable compound | EO modified pentaerytnritol tetraacrylate SR494 (Sartomer) | 17.0 | 17.0 | 17.0 | 17.0 |
| Gelling agent | Shown in Table 8 | 5.0 | 5.0 | 5.0 | 5.0 |
| Surfactant | KF-351A (Shin-Etsu Chemical Co., Ltd.) | 0.1 | 0.1 | 0.1 | 0.1 |
| Photo initiator | Lumicure TPO (BASF) | 5.0 | 5.0 | 5.0 | 5.0 |
| Sensitizer | ITX (DKSH) | 2.0 | 2.0 | 2.0 | 2.0 |

TABLE 8

| Image forming method | Ink composition | Ink composition | Gelling agent | Ink Flow rate in Head Chamber | Ejection | Remarks |
|---|---|---|---|---|---|---|
| 1 | 1 | Ink composition 1 | UNILIN425 | With stirring | 1440 × 1440 dpi | Inv. |
| 2 | 2 | Ink composition 2 | | Flow rate | 2 pl | Inv. |
| 3 | 3 | Ink composition 3 | | 1.3 m/min | | Inv. |
| 4 | 4 | Ink composition 4 | | | | Inv. |
| 5 | 5 | Ink composition 5 | | | | Inv. |
| 6 | 6 | Ink composition 6 | | | | Inv. |
| 7 | 7 | Ink composition 7 | | | | Inv. |
| 8 | 1 | Ink composition 1 | UNILIN425 | Without stirring | 1440 × 1440 dpi | Comp. |
| 9 | 2 | Ink composition 2 | | Conventional head | 2 pl | Comp. |
| 10 | 3 | Ink composition 3 | | | | Comp. |
| 11 | 4 | Ink composition 4 | | | | Comp. |
| 12 | 5 | Ink composition 5 | | | | Comp. |
| 13 | 6 | Ink composition 6 | | | | Comp. |
| 14 | 7 | Ink composition 7 | | | | Comp. |
| 15 | 8 | Comp. Hot melt | — | With stirring Flow rate 1.3 m/min | 1440 × 1440 dpi 2 pl | Comp. |
| 16 | 9 | Comp. Hot melt | — | Without stirring Conventional head | 1440 × 1440 dpi 2 pl | Comp. |
| 17 | 10 | Ink composition 1 | Floraester70 | With stirring | 1440 × 1440 dpi | Inv. |
| 18 | 11 | Ink composition 2 | | Flow rate | 2 pl | Inv. |
| 19 | 12 | Ink composition 3 | | 1.3 m/min | | Inv. |
| 20 | 13 | Ink composition 4 | | | | Inv. |
| 21 | 14 | Ink composition 5 | | | | Inv. |
| 22 | 15 | Ink composition 6 | | | | Inv. |
| 23 | 16 | Ink composition 7 | | | | Inv. |
| 24 | 17 | Ink composition 1 | Stearone | With stirring | 1440 × 1440 dpi | Inv. |
| 25 | 18 | Ink composition 2 | | Flow rate | 2 pl | Inv. |
| 26 | 19 | Ink composition 3 | | 3.0 m/min | | Inv. |
| 27 | 20 | Ink composition 4 | | | | Inv. |
| 28 | 21 | Ink composition 5 | | | | Inv. |
| 29 | 22 | Ink composition 6 | | | | Inv. |
| 30 | 23 | Ink composition 7 | | | | Inv. |
| 31 | 17 | Ink composition 1 | Stearone | With stirring | 1440 × 1440 dpi | Inv. |
| 32 | 18 | Ink composition 2 | | Flow rate | 2 pl | Inv. |
| 33 | 19 | Ink composition 3 | | 1.3 m/min | | Inv. |
| 34 | 20 | Ink composition 4 | | | | Inv. |
| 35 | 21 | Ink composition 5 | | | | Inv. |
| 36 | 22 | Ink composition 6 | | | | Inv. |
| 37 | 23 | Ink composition 7 | | | | Inv. |

TABLE 9

| Image forming method | Ink composition | Ink composition | Gelling agent | Ink Flow rate in Head Chamber | Ejection | Remarks |
|---|---|---|---|---|---|---|
| 38 | 24 | Ink composition 1 | Nomucoat HK-G | With stirring | 1440 × 1440 dpi | Inv. |
| 39 | 25 | Ink composition 2 | | Flow rate | 2 pl | Inv. |
| 40 | 26 | Ink composition 3 | | 1.3 m/min | | Inv. |
| 41 | 27 | Ink composition 4 | | | | Inv. |
| 42 | 28 | Ink composition 5 | | | | Inv. |
| 43 | 29 | Ink composition 6 | | | | Inv. |
| 44 | 30 | Ink composition 7 | | | | Inv. |
| 45 | 24 | Ink composition 1 | Nomucoat HK-G | With stirring | 1440 × 1440 dpi | Inv. |
| 46 | 25 | Ink composition 2 | | Flow rate | 2 pl | Inv. |
| 47 | 26 | Ink composition 3 | | 1.0 m/min | | Inv. |
| 48 | 27 | Ink composition 4 | | | | Inv. |
| 49 | 28 | Ink composition 5 | | | | Inv. |
| 50 | 29 | Ink composition 6 | | | | Inv. |
| 51 | 30 | Ink composition 7 | | | | Inv. |
| 52 | 24 | Ink composition 1 | Nomucoat HK-G | Without stirring | 1440 × 1440 dpi | Comp. |
| 53 | 25 | Ink composition 2 | | | 2 pl | Comp. |
| 54 | 26 | Ink composition 3 | | | | Comp. |
| 55 | 27 | Ink composition 4 | | | | Comp. |
| 56 | 28 | Ink composition 5 | | | | Comp. |
| 57 | 29 | Ink composition 6 | | | | Comp. |
| 58 | 30 | Ink composition 7 | | | | Comp. |
| 59 | 31 | Ink composition 1 | Nomucoat HK-P | With stirring | 1440 × 1440 dpi | Inv. |
| 60 | 32 | Ink composition 2 | | Flow rate | 2 pl | Inv. |
| 61 | 33 | Ink composition 3 | | 1.3 m/min | | Inv. |

TABLE 9-continued

| Image forming method | Ink composition | Ink composition | Gelling agent | Ink Flow rate in Head Chamber | Ejection | Remarks |
|---|---|---|---|---|---|---|
| 62 | 34 | Ink composition 4 | | | | Inv. |
| 63 | 35 | Ink composition 5 | | | | Inv. |
| 64 | 36 | Ink composition 6 | | | | Inv. |
| 65 | 37 | Ink composition 7 | | | | Inv. |
| 66 | 38 | Ink composition 1 | Nomucoat SG | With stirring | 1440 × 1440 dpi | Inv. |
| 67 | 39 | Ink composition 2 | | Flow rate | 2 pl | Inv. |
| 68 | 40 | Ink composition 3 | | 1.3 m/min | | Inv. |
| 69 | 41 | Ink composition 4 | | | | Inv. |
| 70 | 42 | Ink composition 5 | | | | Inv. |
| 71 | 43 | Ink composition 6 | | | | Inv. |
| 72 | 44 | Ink composition 7 | | | | Inv. |
| 73 | 17 | Ink composition 1 | Stearone | With stirring | 1440 × 1440 dpi | Comp. |
| 74 | 18 | Ink composition 2 | | Flow rate | 2 pl | Comp. |
| 75 | 19 | Ink composition 3 | | 6.0 m/min | | Comp. |
| 76 | 20 | Ink composition 4 | | | | Comp. |
| 77 | 21 | Ink composition 5 | | | | Comp. |
| 78 | 22 | Ink composition 6 | | | | Comp. |
| 79 | 23 | Ink composition 7 | | | | Comp. |
| 80 | 45 | Ink composition 1 | Without | With stirring | 1440 × 1440 dpi | Comp. |
| 81 | 46 | Ink composition 2 | gelling | Flow rate | 2 pl | Comp. |
| 82 | 47 | Ink composition 3 | agent | 1.3 m/min | | Comp. |
| 83 | 48 | Ink composition 4 | | | | Comp. |
| 84 | 49 | Ink composition 5 | | | | Comp. |
| 85 | 50 | Ink composition 6 | | | | Comp. |
| 86 | 51 | Ink composition 7 | | | | Comp. |
| 87 | 52 | Ink composition 8 | Stearone 15% (A-400 was reduced in amount of 10% by mass) | With stirring Flow rate 1.3 m/min | 1440 × 1440 dpi 2 pl | Inv. |
| 88 | 53 | | UNILIN425 15% (A-400 was reduced in amount of 10% by mass) | | | Inv. |
| 89 | 54 | | Stearone | | | Inv. |
| 90 | 55 | | Nomucoat HK-G | | | Inv. |
| 91 | 56 | | Nomucoat HK-P | | | Inv. |
| 92 | 57 | | FATTY AMIDE E | | | Inv. |
| 93 | 58 | | NEUTRON-2 | | | Inv. |
| 91 | 56 | | Lunak BA | | | Inv. |
| 92 | 57 | | FATTY AMIDE E 2.5%/ NEUTRON-2 2.5% | | | Inv. |

Gelling agents described in product names in Tables 8 and 9 have structures below:

UNILIN425: polimerizable wax (Baker Hughes)
Floraester70: Jojoba esters (Ikeda Corporation),
Stearone: 18-PENTATRIACONTANONE (reagent)
Nomucoat HK-G: behenic acid/eicosane diacid glyceryl (Nisshin OilliO, Ltd.)
Nomucoat HK-P: behenic acid/eicosane diacid poly glyceryl (Nisshin OilliO, Ltd.)
Nomucoat SG: behenic acid/isostearic acid/eicosane diacid glyceryl (Nisshin OilliO, Ltd.)
FATTY AMIDE E: ERUCAMIDE (Kao Corporation)
NEUTRON-2: sterarylic acid amide (Nippon Fine Chemical Co., Ltd.)
Lunak BA: behenic acid (Kao Corporation)

<<Inkjet Image Forming Method>>

Each ink composition 1-50 prepared above was filled into inkjet recording apparatus providing piezo type inkjet nozzle, and continuous image recording was carried out onto white PET #50 (product of Maruu secchaku) with 600 mm width and 500 m length under condition below.

Ink supply system (not shown in Figure) comprises ink tank, supply pipe, sub-ink tank just before head, pipe with filter and piezo head. Heating was carried out at 100° C. from pre-tank to head. By using four piezo heads having resolution of 360 dpi, voltage was applied so as to eject 2 pl droplet and an image of 1440×1440 dpi was formed. This is corresponding to the criteria of high-definition image reproduction.

Evaluation was carried out by using a recording head with stirring mechanism located inside shown in FIG. 1 under flowing states as listed in Tables 8 and 9.

Flow rate is evaluated for each unit separated a recording head into 16 parts by using FtrPIV (PIV: Particle Image Velocimetry)—Micro system manufactured by FLOWTECH RESEARCH. Average values are listed in Tables 8 and 9. In the constitution of the present invention, it was confirmed that the minimum value of the flow rate is 1.0 m/minute more and the maximum value is 3.0 m/minute or less.

<<Evaluation of Ejection Stability>>

As to each image recorded by above image forming method, after continuous printing of 1 m, 100 m, 500 m, and in case that standing-by 30 minutes after continuous printing of 500 m, re-starting printing and after continuous printing of 1 m, a hollow defect on solid printed matter (un-printed portion caused by coalescence of dots or unstable ejection) was observed, in order to evaluate whether ink was normally ejected from all nozzles or not.

Rank B or better was practically acceptable.
A: No hollow defect was noted.
B: 1 or 2 hollow defects were observed, however disappeared by maintenance of recording head (after pushing out 5 ml of ink, nozzle surface of recording head was wiped by wiping material (nonwoven fabric)).
C: Lot of hollow defects was observed.

<<Evaluation of Curability>>

A piece of adhesive tape (Scotch #250, produced by Sumitomo 3M Co.) was pressed onto solid image printed portion of each cured material samples obtained in the cross cut test of JIS K 5400 and tightly adhered with a roller of 2 kg by back and forth motion, thereafter, the tape was peeled off in one testing session and the number of cross cut-form residue was measured to determine residual sticking rate according to criteria below and used as an index of curability.

Rank B or better was practically acceptable.
A: Residual sticking rate was 80-100%.
B: Residual sticking rate was 60-80%.
C: Residual sticking rate was less than 60%.

<<Pencil Scratch Test>>

After standing 24 hours under 25° C., 60% R. H., each solid image printed matter was measured with respect to hardness according to the pencil scratch test defined in JIS K 5400. The hardness was represented by nominal pencil hardness.

A: Pencil hardness was more than 2H
B: Pencil hardness was B or H
C: Pencil hardness was less than 2B Results are listed in Tables 10 and 11.

TABLE 10

| Image forming method | Hollow defect | | | | Sticking Rate 1 m Print | Pencil Scratch Test 1 m Print | Remarks |
|---|---|---|---|---|---|---|---|
| | 1 m Print | 100 m Print | 500 m Print | After standing-by 1 m Print | | | |
| 1 | B | B | B | B | B | B | Inv. |
| 2 | A | A | B | B | A | A | Inv. |
| 3 | B | B | B | B | B | B | Inv. |
| 4 | A | A | A | B | A | A | Inv. |
| 5 | B | B | B | B | B | B | Inv. |
| 6 | A | A | B | B | B | A | Inv. |
| 7 | A | A | A | A | B | A | Inv. |
| 8 | B | B | C | C | B | B | Comp. |
| 9 | C | C | C | C | A | A | Comp. |
| 10 | B | C | C | C | B | B | Comp. |
| 11 | B | C | C | C | A | A | Comp. |
| 12 | B | B | C | C | B | B | Comp. |
| 13 | C | C | C | C | A | A | Comp. |
| 14 | B | C | C | C | A | A | Comp. |
| 15 | A | A | A | A | C | C | Comp. |
| 16 | A | A | B | B | C | C | Comp. |
| 17 | A | A | A | A | B | A | Inv. |
| 18 | A | A | A | B | B | A | Inv. |
| 19 | A | A | A | B | B | A | Inv. |
| 20 | A | A | A | A | B | A | Inv. |
| 21 | A | A | A | A | B | A | Inv. |
| 22 | A | A | A | B | B | A | Inv. |
| 23 | A | A | A | A | B | A | Inv. |
| 24 | A | A | A | A | B | B | Inv. |
| 25 | A | A | A | B | A | B | Inv. |
| 26 | A | A | A | B | B | B | Inv. |
| 27 | A | A | A | A | A | B | Inv. |
| 28 | A | A | A | A | B | B | Inv. |
| 29 | A | A | A | B | A | B | Inv. |
| 30 | A | A | A | A | A | B | Inv. |
| 31 | A | A | A | A | B | B | Inv. |
| 32 | A | A | B | B | A | B | Inv. |
| 33 | A | A | A | B | B | B | Inv. |
| 34 | A | A | A | A | A | B | Inv. |
| 35 | A | A | A | A | B | B | Inv. |
| 36 | A | A | B | B | A | B | Inv. |
| 37 | A | A | A | A | A | B | Inv. |

TABLE 11

| Image forming method | Hollow defect | | | | Sticking Rate 1 m Print | Pencil Scratch Test 1 m Print | Remarks |
|---|---|---|---|---|---|---|---|
| | 1 m Print | 100 m Print | 500 m Print | After standing-by 1 m Print | | | |
| 38 | A | A | A | A | A | A | Inv. |
| 39 | A | A | A | A | A | A | Inv. |
| 40 | A | A | A | A | A | A | Inv. |
| 41 | A | A | A | A | A | A | Inv. |
| 42 | A | A | A | A | A | A | Inv. |
| 43 | A | A | A | A | A | A | Inv. |
| 44 | A | A | A | A | A | A | Inv. |
| 45 | A | A | A | A | A | A | Inv. |
| 46 | A | A | A | A | A | A | Inv. |
| 47 | A | A | A | A | A | A | Inv. |
| 48 | A | A | A | A | A | A | Inv. |
| 49 | A | A | A | A | A | A | Inv. |
| 50 | A | A | A | A | A | A | Inv. |
| 51 | A | A | A | A | A | A | Inv. |
| 52 | A | A | A | C | A | A | Comp. |

TABLE 11-continued

| Image forming method | 1 m Print | 100 m Print | 500 m Print | After standing-by 1 m Print | Sticking Rate 1 m Print | Pencil Scratch Test 1 m Print | Remarks |
|---|---|---|---|---|---|---|---|
| | | | Hollow defect | | | | |
| 53 | A | A | B | C | A | B | Comp. |
| 54 | A | A | B | C | A | B | Comp. |
| 55 | A | A | B | C | A | A | Comp. |
| 56 | A | A | B | C | A | B | Comp. |
| 57 | A | A | B | C | A | A | Comp. |
| 58 | A | A | B | C | A | A | Comp. |
| 59 | A | A | A | A | A | A | Inv. |
| 60 | A | A | A | A | A | A | Inv. |
| 61 | A | A | A | A | A | A | Inv. |
| 62 | A | A | A | A | A | A | Inv. |
| 63 | A | A | A | A | A | A | Inv. |
| 64 | A | A | A | A | A | A | Inv. |
| 65 | A | A | A | A | A | A | Inv. |
| 66 | A | A | A | A | A | A | Inv. |
| 67 | A | A | A | A | A | A | Inv. |
| 68 | A | A | A | A | A | A | Inv. |
| 69 | A | A | A | A | A | A | Inv. |
| 70 | A | A | A | A | A | A | Inv. |
| 71 | A | A | A | A | A | A | Inv. |
| 72 | A | A | A | A | A | A | Inv. |
| 73 | A | A | B | C | A | A | Comp. |
| 74 | A | A | B | C | A | B | Comp. |
| 75 | A | A | B | C | A | B | Comp. |
| 76 | A | A | B | C | A | A | Comp. |
| 77 | A | A | B | C | A | B | Comp. |
| 78 | A | A | B | C | A | A | Comp. |
| 79 | A | A | B | C | A | A | Comp. |
| 80 | B | B | B | B | B | B | Comp. |
| 81 | C | C | C | C | A | A | Comp. |
| 82 | B | B | B | C | B | B | Comp. |
| 83 | B | B | B | B | A | A | Comp. |
| 84 | B | B | B | B | B | B | Comp. |
| 85 | C | C | C | C | A | A | Comp. |
| 86 | B | B | B | B | A | A | Comp. |
| 87 | A | A | B | B | B | B | Inv. |
| 88 | B | B | B | B | B | B | Inv. |
| 89 | A | A | B | B | A | A | Inv. |
| 90 | A | A | A | A | A | A | Inv. |
| 91 | A | A | B | B | B | A | Inv. |
| 92 | A | A | A | A | A | A | Inv. |

The results described in Tables 10 and 11 clearly show that the image forming method of the present invention exhibits excellent ejection stability after waiting for printing as well as ink curability under the conditions for high-definition image reproduction.

DESCRIPTION OF THE ALPHANUMERIC DESIGNATIONS

| | |
|---|---|
| 1 | Inkjet recording head |
| 2 | Pressure chamber |
| 3 | Nozzle |
| 4 | Ink chamber |
| 5 | Partition wall |
| 6 | Stirring blade |
| 10 | Heating member |
| 11 | Pump 1 |
| 12 | Pump 2 |
| 13 | Flow control valve |
| 14 | Baffle plate |
| 15 | Ink flow path |

What is claimed is:

1. A method for forming an inkjet image in which the inkjet image is formed by ejecting an ink composition onto a medium from a nozzle of an inkjet recording head comprising a plurality of pressure chambers, a plurality of nozzles in communication with the pressure chambers and an ink chamber in communication with a side of a plurality of the pressure chamber on which side is opposite to a side of the nozzle of the pressure chamber, and the ink chamber is filled with the ink composition, wherein
the ink composition comprises an photo-initiator, a polymerizable compound and a gelling agent; and comprising steps of:
heat-keeping a temperature of the ink composition in the ink chamber at 70° C.-140° C. during an image recording including during standing-by, and
flowing the ink composition in the ink chamber at a flow rate of 1.0-3.0 m/min.

2. The method for forming an inkjet image of claim 1, wherein a content of the gelling agent in the ink composition is 3-10% by mass.

3. The method for forming an inkjet image of claim 1, wherein the gelling agent is an ester compound of behenic acid or eicosanedioic acid with glycerine or polyglycerine; or an ester compound of behenic acid, isostearic acid and eicosanedioic acid with glycerine.

4. The method for forming an inkjet image of claim 1 comprising a step of curing the ink composition ejected onto the medium.

5. The method for forming an inkjet image of claim 1, wherein the flowing step further comprises a step of stirring the ink composition.

* * * * *